United States Patent [19]

Fromm et al.

[11] 4,171,498

[45] Oct. 16, 1979

[54] HIGH PRESSURE ELECTRIC DISCHARGE LAMP CONTAINING METAL HALIDES

[75] Inventors: Dietrich Fromm, Warngau; Jürgen Seehawer, Munich; Wolf-Jürgen Wagner, Munich; Erich Winzerling, Munich, all of Fed. Rep. of Germany

[73] Assignee: Patent-Treuhand-Gesellschaft für elektrische Glühlampen mbH, Munich, Fed. Rep. of Germany

[21] Appl. No.: 854,765

[22] Filed: Nov. 25, 1977

[30] Foreign Application Priority Data

Dec. 6, 1976 [DE] Fed. Rep. of Germany ....... 2655167

[51] Int. Cl.[2] .............................................. H01S 61/18

[52] U.S. Cl. .................................... 313/229; 313/225; 313/47; 313/116; 313/485

[58] Field of Search ................. 313/229, 225, 47, 116, 313/485

[56] References Cited

U.S. PATENT DOCUMENTS

| | | | |
|---|---|---|---|
| 3,398,312 | 8/1968 | Edris et al. | 313/229 X |
| 3,753,018 | 8/1973 | Beijer et al. | 313/229 X |
| 3,781,586 | 12/1973 | Johnson | 313/229 X |
| 3,958,145 | 5/1976 | Jack et al. | 313/229 X |

*Primary Examiner*—Rudolph V. Rolinec
*Assistant Examiner*—Darwin R. Hostetter
*Attorney, Agent, or Firm*—Frishauf, Holtz, Goodman & Woodward

[57] ABSTRACT

A high pressure electric arc tube discharge lamp utilizing low power input. The electrode spacing is less than 20 mm and the arc is electrode-stabilized. The arc tube is of isothermal design. The gas fill of the lamp contains a mixture of metal (i) iodides or (ii) iodides and bromides. The metal halides must include at least the halides of sodium and tin. Mercury is preferred as the buffer gas. When operating, the lamp has a low-color temperature, a luminous efficacy of 80 lms/W and a color-rendering index of about 75. It is suitable for use in interior lighting.

15 Claims, 3 Drawing Figures

HIGH PRESSURE ELECTRIC DISCHARGE LAMP CONTAINING METAL HALIDES

BACKGROUND OF THE INVENTION

The present invention relates to an improved high pressure electric discharge lamp.

DT-OS No. 24 22 411 discloses the filling for a high pressure mercury vapor discharge lamp containing mercury and at least one of the halogens, iodine, bromine, chlorine; a halide of at least one of the metals from the group of alkali and alkaline earth metals, and, if desired, of cadmium, gallium, indium, thallium, tin, scandium, yttrium, and rare earth metals; and also a volatile halide. Aluminum halide, or a aluminum halide together with a halide of trivalent iron, bivalent tin and/or trivalent indium, are disclosed as the volatile halide. The numerous examples disclose that usually aluminum chloride is added, less frequently the bromide.

Because of the presence of the nonvolatile alkali metal halides and alkaline earth metal halides, the lamp under normal conditions does not contain sufficient halide in the vapor state, which adversely affects the luminous efficacy and color rendering of the lamp. The volatile aluminum chloride which together with the nonvolatile alkali metal halides and alkaline earth metal halides forms a gaseous compound, is used with the intention to thereby increase effective partial pressure of the nonvolatile compounds without increasing the thermal load on the arc tube wall. Said DT-OS No. 24 22 411 also discloses lamps having a filling of sodium iodide and the tin iodide, with or without aluminum chloride. From the foregoing, it follows that the addition of tin iodide to the sodium iodide without aluminum chloride will not result in a lamp of satisfactory luminous efficacy. The electrodes of the lamps are spaced a long distance of 40 mm which is almost to three times the inner diameter of the tube, so that the lamp is not electrode-stabilized.

The use of a volatile complex halide compound of tin and sodium has become known from DT-OS No. 26 05 290, wherein as disclosed in the examples, the chlorine is always the halogen present in the filling. Iodine, on the other hand, is never used as the only halogen. The color temperature of said lamps does not exceed 3900–4600 K. In the examples, the electrodes are spaced 20 mm apart. It can be concluded from the long distance separating the electrodes, that the lamps are wall-stabilized and not electrode-stabilized.

Another lamp has already been proposed which contains for excitation of molecular emission the preferred mercury and the rare earth metals and, in addition, alkali metal halide and alkaline earth metal halide, thallium halide and tin halide.

The present invention seeks to provide a lamp which, while exhibiting high luminous efficacy (>70 lm/W) and low color temperature (below 3800 K), has a good color rendering (general color rendering index according to CIE of $R_a > 70$), the least possible power input, independence of position, a long service life, is suitable for use for interior lighting.

STATEMENT OF THE INVENTION

The present invention provides a high pressure electric discharge lamp comprising an arc tube of transparent material having high strength at high temperature and electrodes of refractory metal sealed into the arc tube. Its filling contains at least one buffer gas and metal halide additives, among them at least tin halide and sodium halide. The lamp contains only iodides, or iodides and bromides as the halides. It contains only iodine, or iodine and bromine as the halogen. It has an electrode-stabilized arc with the electrodes spaced a distance of less than 20 mm, a specific arc load of from 100 to 300 W/cm of arc length, a wall loading of from 15 to 100 W/cm$^2$, an operating pressure of from 5 to 50 A, and an arc tube of isothermal geometry.

Mercury, a noble gas, or carbon monoxide may be used as the buffer gas. In addition to the iodides or/and bromides of sodium and tin, the lamp may also contain metal iodides and bromides, i.e., of gallium, germanium, cadmium, copper, etc., and preferably of thallium and indium, and also contains additional iodine, or iodine and bromine. The following dosages per cubic centimeter for the respective fill components proved particularly effective: 0.5–50 $\mu$moles of tin, 2–50 $\mu$moles of sodium, 0.01–20 $\mu$moles of lithium, 0.05–3 $\mu$moles of thallium, 5–200 $\mu$moles of mercury, 0.05–20 $\mu$moles of additional iodides, or iodides and bromides which may be compounded with sodium or tin in the form of complex compounds, 2–200 $\mu$moles of iodine and bromine atoms, the atom ratio of bromine to iodine amounting to from 0 to 2, and noble gases or a Penning mixture of 15–80 torr at 20° C. The elements may be present in the form of metal or as the iodide, or iodide and bromide, with sodium preferably being introduced in the form of halide. The lamp filling of the present invention contains no fluorides or chlorides.

It is preferred to use an oxide of the rare earth metals, preferably dysprosium oxide, as the emitter for the electrodes of refractory material, preferably tungsten.

The electrode stabilization of the arc is achieved by spacing the electrodes a short distance apart, preferably about 10 mm, whereby the lamp becomes independent of arc position. To attain satisfactory radiation characteristics and long useful life of the lamp, it is important to provide optimum shaping of the arc tube, i.e., an isothermal design. For this, the isothermal lines of cylindrical plasma discharges were theoretically determined by computing cylindrical arcs with surface emitters, i.e., with electrodes. The result is an ellipsoidal arc tube design, superimposed by a smaller ellipsoid at the arc tube ends, so that a sort of bell shape results at the ends. Said isothermal arc tube design inhibits cold spots at which the partial pressure of the metal halides is lowered. With this arc tube design it is possible to keep the temperature differential between the coldest and the hottest spots on the outer surface of the arc tube less than 100° K. of temperature. Such a distribution of temperature is desirable because the vapor pressure in the arc tube is determined by the temperature in the coldest spot; whereas, the permissible quartz wall loading is determined by the temperature at the hottest spot. Thus, the upper limit cannot be exceeded. The closer the lower limit comes up to the upper limit, i.e., the smaller the temperature differential, the more favorable is the condition in relation to the vapor/pressure. Preferably, the arc tube is partly or wholly frosted on its outer surface or provided with a heat-ray reflecting or -absorbing coating and surrounded by an outer envelope which may suitably be coated on its inner surface wholly or partly with a phosphor material and/or with an IR-absorbing or -reflecting layer. Color rendering of the lamp in the red spectral region can be further improved by the presence of said phosphor.

The combination of features of the lamp according to the present invention makes it suitable for indoor lighting. The problems encountered with a lamp suited for this purpose are reviewed:

The object of the present invention is to provide novel lamps which have, when compared with incandescent lamps and halogen cycle incandescent lamps, the same power consumption but a light emission about 3–5 times higher and a service life increased almost 5–10 times. The prior art halogen metal vapor lamps, in spite of good luminous efficacy, are not useful for interior lighting due to their high color temperature (insufficient warmth of light) or because of poor color rendering (high pressure sodium vapor lamp). Moreover, it is desirable for interior lighting to have lower power input. However, with lamps of lower power input, more technological difficulties are encountered. Adumbration as well as electrical and thermal losses are higher in lamps of smaller size which necessarily have electrodes spaced a shorter distance apart and arc tubes of smaller sizes. Losses, however, have a negative influence on radiation output and luminous efficacy. Higher wall loads in order to obtain increased luminous efficacies have to be avoided because of reduced lamp life resulting therefrom.

The lamp design according to the invention is such as to increase the particle density within the lamp and to utilize the molecular radiation. A high particle density is favorable because the population density of the excited atoms or molecules increases with increasing particle density at equal temperature and, consequently, radiant output also increases. It was formerly theorized that the highly volatile, very aggressive chlorine which highly reduces useful life was required. It has now been found that the lamps according to the present invention requiring only low power input and having good isothermal characteristics and having substantially equal luminous efficacy and color rendering, can attain an increased service life, i.e., more than 3000 hours, when using specified quantities of the less aggressive iodides and bromides. This result is thus one order of magnitude higher than the previously obtained result.

The figures of the accompanying drawing illustrate various embodiments of the lamp according to the present invention.

Figure 1:
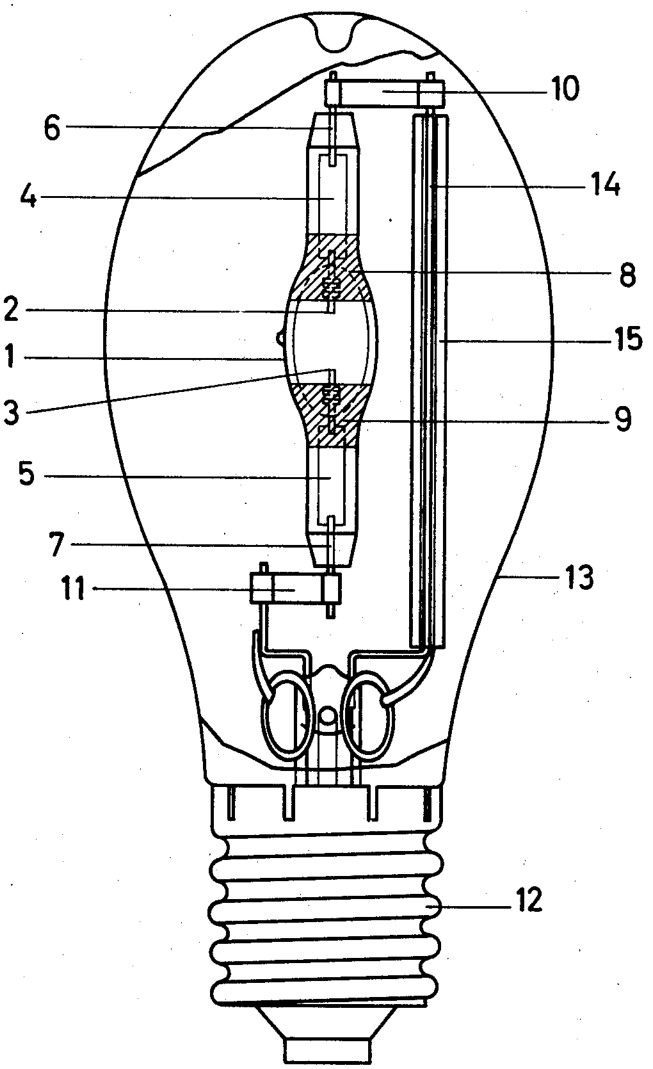
FIG. 1 is a partial cross-section of a lamp having an ellipsoidal outer envelope.

In FIG. 1, the arc tube 1 of quartz glass is of isothermal design and has an inner diameter of 10 mm max. and a volume of about 1 cubic centimeter. At each end of the arc tube there is an electrode 2 or 3, respectively, of tungsten with an emitter of dysprosium oxide to facilitate cold start up. The electrodes 2 and 3 are connected to the leadwires 6 and 7 by foil strips 4 and 5 melted in the glass (sealed). The electrodes are spaced a distance of 10 mm. The ends of arc tube 1 are provided with a heat-ray reflecting and -absorbing coating 8 or 9 or zirconium dioxide. The arc tube 1 is positioned by mounting supports 10 and 11 in an ellipsoidal outer envelope 13 which is provided at one end with the screw base 12. The leadwire portion 14 is surrounded by quartz glass tube 15.

The filling of arc tube 1 comprises a starting gas, for example, a rare gas or a Penning mixture of 30–40 torr and, per cubic centimeter, 6 μmoles of tin, 5 μmoles of sodium, 0.15 μmole of lithium, 0.6 μmole of thallium, 70 μmoles of mercury, 13 μmoles of iodine and bromine atoms, 0.5 μmole of indium. The atomic ratio of bromine to iodine is 0.7. The structural data and fill quantities are for a lamp having a power input of 250 W, which is operated with 3–3.8 A from 220 volts A.C. voltage. The wall loading of the arc tube 1 is approximately 40 $W/cm^2$, the specific arc load about 250 W/cm. The lamp has a pressure of approximately 20 A. The luminous efficacy is 80 lm/W with a color temperature of 3000 K and a color-rendering index $R_a = 75$.

Figure 2:
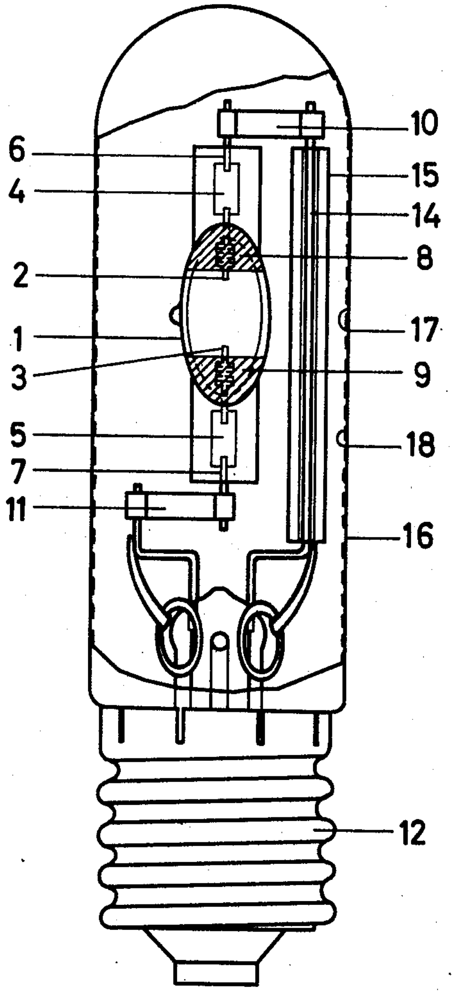
FIG. 2 is a partial cross-section of a lamp having a tubular outer envelope.

In FIG. 2, the inner wall surface of the tubular outer bulb 16 is coated with an IR-reflecting layer 17 and a red-emitting phosphor 18, for example, of magnesium-fluorogermanate.

Figure 3:
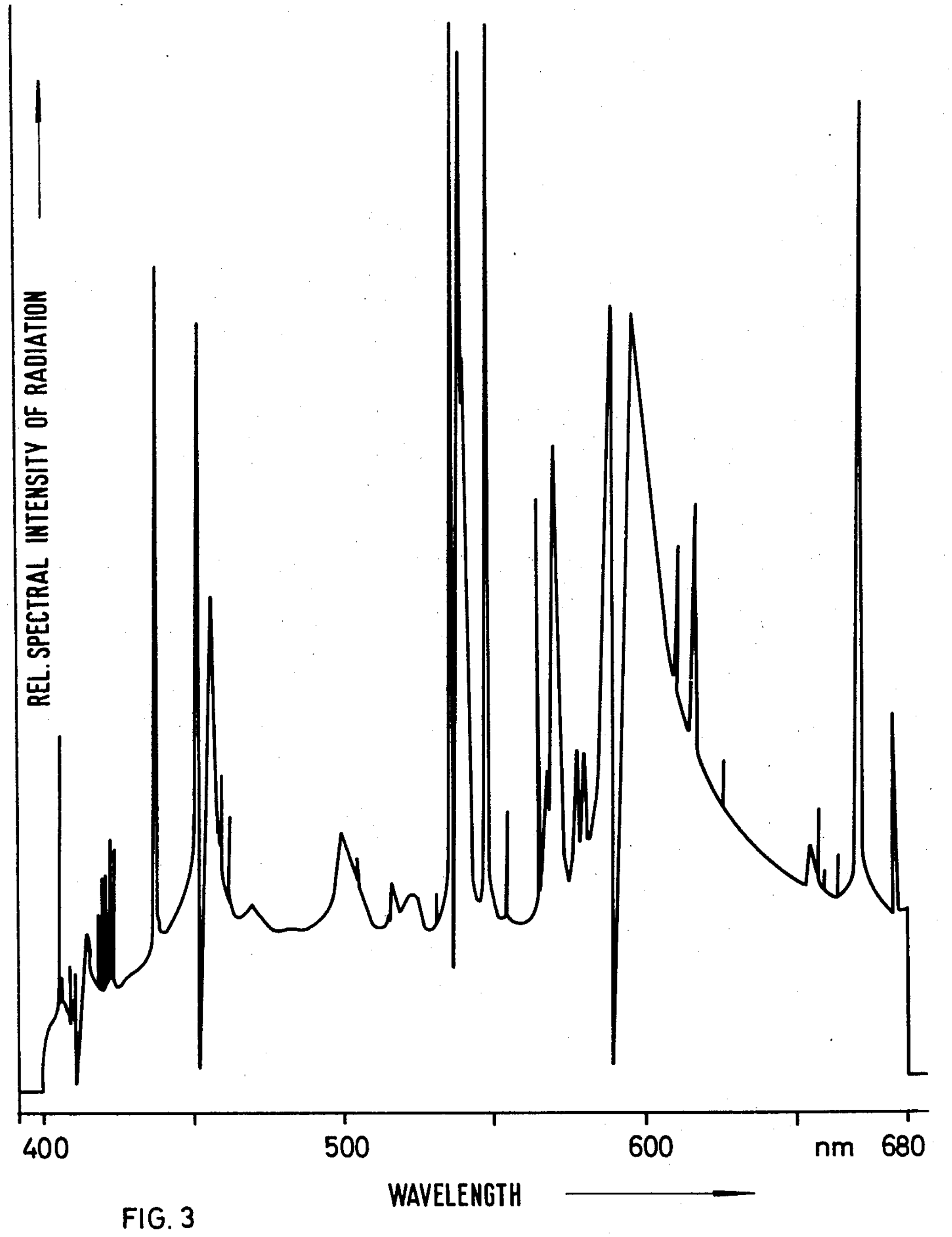
FIG. 3 is a graph of the relative spectral radiation intensity.

FIG. 3 graphs the relative spectral intensity of radiation of a 250 W lamp which contains a filling as given in the description of FIG. 1. The strong continuum component due to molecular radiation is clearly discernible. It is additionally superposed by lines pressure broadened by collisions with the atoms or molecules of the buffer gas.

It is generally preferred that the electrodes be spaced apart less than about 14 mm with particularly preferred results obtained with the present embodiments of the invention when the electrode spacing is about 10 mm.

Preferred ranges of dosage per cubic centimeter for the fill components are the following: 1–25 μmoles of tin, 2–30 μmoles of sodium, 0.02–10 μmoles of lithium, 0.05–3 μmoles of thallium, 20–200 μmoles of mercury, 4–150 μmoles of iodine and bromine atoms, the atom ratio of bromine to iodine amounting to from 0 to 2, and noble gases or a Penning mixture of 15–80 torr at 20° C. or, 1–25 μmoles of tin, 2–30 μmoles of sodium, 0.02–10 μmoles of lithium, 0.05–3 μmoles of thallium, 20–200 μmoles of mercury, 0.05–10 μmoles of at least one metal selected from the group consisting of indium, gallium, cadmium, germanium, copper, 4–150 μmoles of iodine and bromine atoms, the atom ratio of bromine to iodine amounting to from 0 to 2, and noble gases or a Penning mixture of 15–80 torr at 20° C.

Penning mixture is a mixture of gases, for example, argon and mercury, or argon and neon, where at least one of the gaseous components has metastable states. The advantage of using a Penning mixture is that ionization for ignition takes place in a two-step process resulting in improved ignition.

We claim:

1. A high pressure electric discharge lamp having, a color temperature below about 3800° K. and good color rendering, comprising a transparent arc tube having high strength at elevated temperatures and having an isothermal shape, opposed refractory metal electrodes sealed into the arc tube, said electrodes being spaced less than 20 mm apart, said lamp having an electrode-stabilized arc, a specific arc load of from 100 to 300 W/cm of arc length, a wall loading of from 15 to 100 $W/cm^2$, an operating pressure of from 5 to 50 A, and a filling containing at least one buffer gas, halogen gas, and metal halide additives which include at least tin halide and sodium halide, said lamp containing as the only halides, iodides or a mixture of iodides and bromides and, as the only halogens, iodine or a mixture of iodine and bromine.

2. The lamp of claim 1 wherein said buffer gas is selected from the group consisting of mercury, a noble gas, and carbon monoxide.

3. The lamp of claim 1 wherein said filling comprises per cubic centimeter, 0.5–50 μmoles of tin, 2–50 μmoles of sodium, 0.01–20 μmoles of lithium, 0.05–3 μmoles of thallium, 5–200 μmoles of mercury, 2–200 μmoles of iodine and bromine atoms, the atomic ratio of bromine to iodine being from 0 to 2, and a noble gas or a Penning mixture of from 15 to 80 torr at 20° C.

4. The lamp of claim 1 wherein said filling contains per cubic centimeter 0.5–50 μmoles of tin, 2–50 μmoles of sodium, 0.01–20 μmoles of lithium, 0.05–3 μmoles of thallium, 5–200 μmoles of mercury, 0.05–20 μmoles of at least one metal selected from the group consisting of indium, gallium, cadmium, germanium, and copper, 2–200 μmoles of iodine and bromine atoms, the atomic ratio of bromine to iodine being from 0 to 2, and noble gas or a Penning mixture of from 15 to 80 torr at 20° C.

5. The lamp of claim 4 wherein said electrodes comprise a refractory metal and a rare earth metal oxide as the emitter.

6. The lamp of claim 5 wherein said electrodes are tungsten electrodes activated with dysprosium oxide.

7. The lamp of claim 1 wherein the outer surface of said arc tube is at least partially frosted or at least partially provided with an infrared-absorbing or infrared-reflecting layer.

8. The lamp of claim 1 wherein said arc tube is enclosed within an outer transparent envelope.

9. The lamp of claim 8 wherein the inner surface of said outer envelope is at least partially coated with a layer selected from the group consisting of phosphor coatings, infrared-absorbing coatings, and infrared-reflecting coatings.

10. The lamp of claim 1 wherein the temperature differential between the coldest spot and the hottest spot on the outer surface of said arc tube is less than 100° K.

11. The lamp of claim 1 wherein said buffer gas is mercury.

12. The lamp of claim 4 wherein said electrodes are spaced about 10 mm apart.

13. The lamp of claim 1 wherein said filling comprises per cubic centimeter, 1–25 μmoles of tin, 2–30 μmoles of sodium, 0.02–10 μmoles of lithium, 0.05–3 μmoles of thallium, 20–200 μmoles of mercury, 4–150 μmoles of iodine and bromine atoms, the atomic ratio of bromine to iodine being from 0 to 2, and a noble gas or a Penning mixture of from 15 to 80 torr at 20° C.

14. The lamp of claim 11 wherein said filling contains per cubic centimeter 1–25 μmoles of tin, 2–30 μmoles of sodium, 0.02–10 μmoles of lithium, 0.05–3 μmoles of thallium, 20–200 μmoles of mercury, 0.05–10 μmoles of at least one metal selected from the group consisting of indium, gallium, cadmium, germanium, and copper, 4–150 μmoles of iodine and bromine atoms, the atomic ratio of bromine to iodine being from 0 to 2, and noble gas or a Penning mixture of from 15 to 80 torr at 20° C.

15. The lamp of claim 1 wherein said electrodes are spaced less than about 14 mm apart.

* * * * *